United States Patent [19]

Greengrass

[11] 4,170,675

[45] Oct. 9, 1979

[54] REINFORCED FLEXIBLE PANELS COMPRISING PLASTIC SHEETING ON OPPOSED SIDES OF A MESH LAYER AND A METAL FOIL LAYER IN ASSOCIATION WITH A PLASTIC SHEET LAYER

[75] Inventor: Michael Greengrass, Norwich, England

[73] Assignee: Flexipane Limited, England

[21] Appl. No.: 914,278

[22] Filed: Jun. 9, 1978

Related U.S. Application Data

[63] Continuation-in-part of Ser. No. 792,803, May 2, 1977, Pat. No. 4,096,304.

[51] Int. Cl.² .............. B32B 3/24; B32B 5/02; B32B 15/08; B32B 27/08
[52] U.S. Cl. .................. 428/109; 428/110; 428/182; 428/247; 428/256; 428/920
[58] Field of Search ............... 428/109, 110, 247, 256, 428/920

[56] References Cited

U.S. PATENT DOCUMENTS

| 2,384,771 | 9/1945 | Ryan | 428/256 |
| 2,742,391 | 4/1956 | Warp | 428/256 |
| 3,310,453 | 3/1967 | Lappala et al. | 428/256 |
| 3,660,138 | 5/1972 | Garrell | 28/75 |
| 4,013,812 | 3/1977 | Geiger | 428/245 |
| 4,096,304 | 6/1978 | Greengrass | 428/247 |

*Primary Examiner*—J. C. Cannon
*Attorney, Agent, or Firm*—Allegretti, Newitt, Witcoff & McAndrews

[57] ABSTRACT

A fire-retardant sheet comprising superposed layers including a plastic material with a metal foil on one side and a further plastic sheet or layer laminated thereto with the interposition of a wire mesh.

7 Claims, 9 Drawing Figures

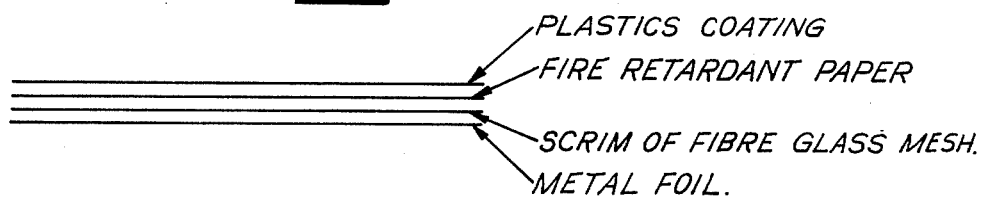
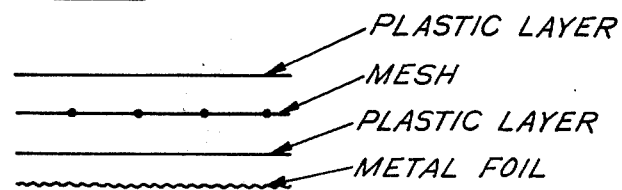
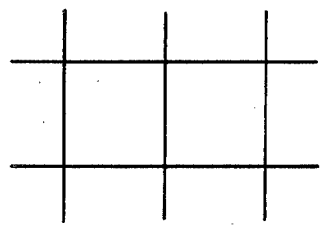
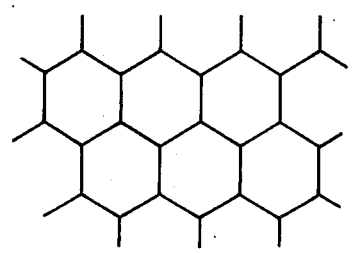
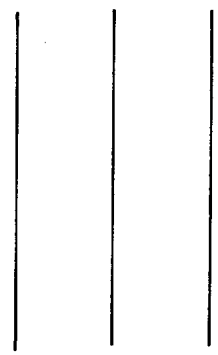

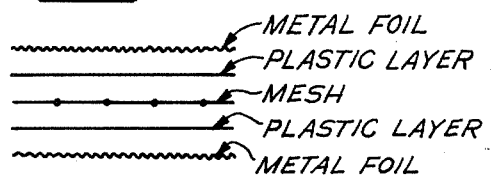
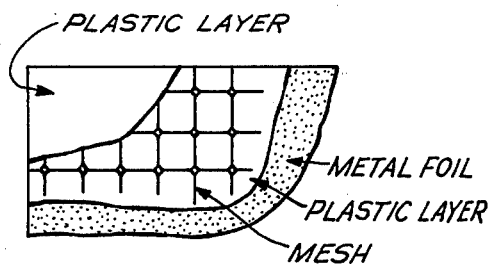
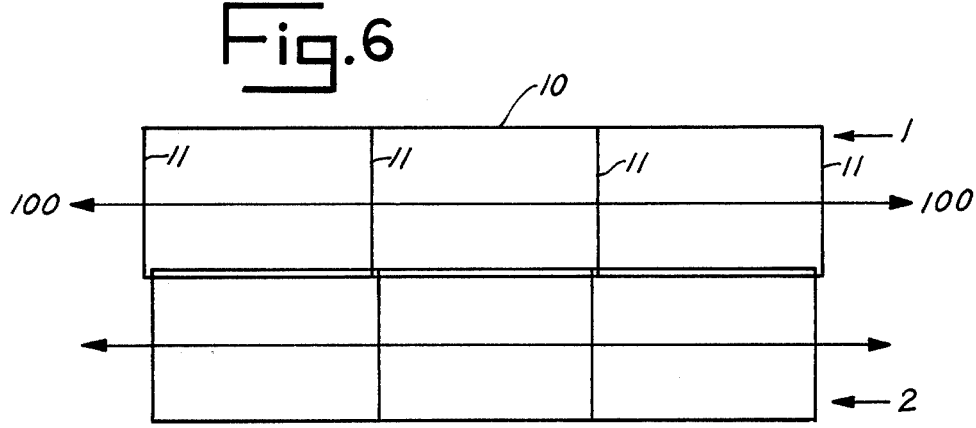
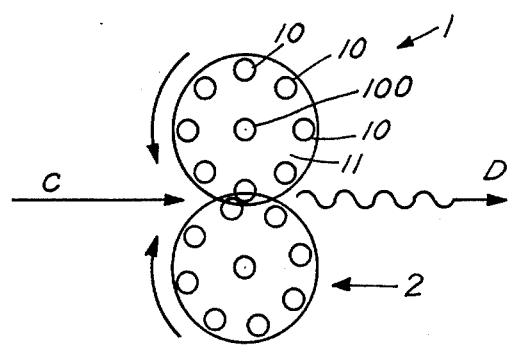

REINFORCED FLEXIBLE PANELS COMPRISING PLASTIC SHEETING ON OPPOSED SIDES OF A MESH LAYER AND A METAL FOIL LAYER IN ASSOCIATION WITH A PLASTIC SHEET LAYER

CROSS REFERENCE TO RELATED APPLICATION

This is a continuation in part of application Ser. No. 792,803 filed May 2, 1977 now U.S. Pat. No. 4,096,304 which is incorporated herewith by reference.

BACKGROUND OF THE INVENTION

The present invention relates to reinforced flexible panels and to a method and means of corrugating them.

There exists a need and demand in the building and construction industry for flexible sheets of water-impermeable and insulating material with a degree of inherent strength, whereby said sheets may be self-supporting. Many known plastic sheets variously suffer from the disadvantage of being flimsy, inflammable, poor insulators and awkward to use as construction materials. It is an object of the present invention to provide improvements over the art.

There is known and sold, for instance as Sisalkraft 310, a reinforced flame retardant sheet which serves as a moisture and vapor barrier and is foil faced to provide reflective insulation. The general nature of such a known sheet in cross section is shown in FIG. 1 of the accompanying drawings, the four layers of the sheet being shown separated in exaggerated form for clarity. A fire retardant paper sheet is coated on one surface with a plastic material and on the other surface with a metal foil, a scrim of fiberglass mesh being sandwiched between the foil and paper. As will be evident, such a sheet, although fire retardant and reflective, has no inherent strength, is in no way self-supporting and is awkward to use and secure as a construction material.

It is a more specific object of the invention to provide an improvement over such known sheets.

SUMMARY OF THE INVENTION

According to one aspect of the invention, there is provided a foil bonded to a plastic sheet with a second plastic sheet or layer laminated thereto with the interposition of either a metal support mesh or a mesh of cords. The sheet, when reinforced with a metal support, is self-supporting and the sheet, when reinforced with a mesh of cords, for instance of nylon, is readily supportable by attachment of the cord ends to support members, such as beams or the like.

The metal support mesh may be of rectangular form or of diamond form, as desired, and the nylon mesh may comprise simple linear strands or a cross-matrix of such strands.

BRIEF DESCRIPTION OF THE DRAWING

In order that the invention may be more readily understood, reference will now be made to the accompanying drawings which are given by way of example, and in which:

FIG. 1, as previously explained, illustrates in exaggerated cross section separation the component parts of reinforced flame retardant barrier paper with a foil face as marketed under the trade mark Sisalkraft 310;

FIG. 2 schematically illustrates the layers comprising the sheet according to the present invention;

FIG. 3A shows schematically a rectangular metal support mesh;

FIG. 3B shows schematically a diamond metal support mesh, and

FIG. 3C shows schematically a linear arrangement of nylon cords, as may be additionally or alternatively sandwiched between the plastic layers as shown in FIG. 2;

FIG. 4 is a schematic view of an alternative embodiment of the invention;

FIG. 5 is a cutaway plan view of the embodiment of FIG. 2;

FIG. 6 shows a corrugating machine for manufacture of the present invention in schematic plan view, and FIG. 7 shows the machine of FIG. 5A in side view.

DESCRIPTION OF THE PREFERRED EMBODIMENT

In FIG. 1 there is shown a sheet of Sisalkraft 310 or similar material (fire retardant paper covered on one surface with a plastic coating and on the other surface with a metal foil sandwiching a scrim of fiberglass mesh). In FIG. 2, there is shown a first embodiment of the present invention with a metal support mesh sandwiched between plastic layers and with foil on the outside of one layer. Metal support mesh or nylon cords may be provided between the plastic layers.

In FIG. 5 there is shown a cutaway plan view of the sheet of FIG. 2. The foil layer is bonded to a plastic layer which, in turn, is bonded to a second plastic layer with an interposed metal mesh.

FIGS. 3A and B show, in generally schematic form, two possible types of metal support mesh which may be sandwiched between the plastic sheets and FIG. 3C shows a small section of linear nylon cords which may likewise be sandwiched.

In FIG. 4 an alternative embodiment is shown wherein both of the plastic layers are bonded with metal foil (aluminum foil) to give added structural strength, reflectivity, insulation characteristics and fire retardant characteristics.

In FIG. 6 there is shown a mechanism for manufacture of the sheets of the invention including a first compression member 1, which comprises a plurality (preferably twelve) of elongated metal rods 10 secured by spacers 11 at equal distances from, and at equal angles around, a rotary axis 100. The rotary axis also conveniently takes the form of an elongated metal rod mounted in end bearings. The member 1 is freely rotatable by hand and meshes with a compression member 2 which is exactly, or substantially exactly, similar to the member 1. Thus, rotation of one member by hand in the direction of the associated curved arrow also rotates the other member in the direction of the associated curved arrow. As shown, there is thus generated between the two members an intermittent nip, so that a sheet introduced as at arrow C is drawn through the machine and emerges as at arrow D in corrugated form. An advantage of the arrangement is that the rods 10 may be of substantial length because one compression member generally supports the other along the length of the rods. Also, the members do not require heating or a motorized drive.

Corrugated sheets, according to the invention, have good inherent strength and may be used for roofing or other self supporting purposes. Sheets provided with nylon cords can also be used for roofing and other purposes where it is convenient to secure them by nails.

Sheets, according to the invention, constitute a barrier to heat, water and vapor and may be used for insulating tanks, pipes or wall cavities and the like. Because the corrugating arrangement described runs cold, the corrugation does not damage the material of the sheet.

The following is an example of the embodiment of the invention depicted in FIG. 2:

Two layers of polyethylene 1.18 mil in thickness (0.03 mm.) were applied to opposite sides of a wire mesh (0.95 mm. grade mesh). Prior to application of the plastic layers, aluminum foil of 0.354 mil thickness (0.009 mm.) is attached to one outside surface of a plastic layer. Fusing of the plastic layers is effected by application of heat as the layers are pressed together with the interposed mesh. The resultant sheet is resistant to wind, heat and has good structural integrity. The sheet provides a low cost environmental barrier which is generally fire resistant.

While there has been set forth a preferred embodiment of the invention, it is understood that the invention shall be limited only by the following claims and their equivalents.

What is claimed is:

1. A fire resistant and environmental containment sheet comprising, in combination:
    at least four layers including opposed layers of plastic material on opposite sides of a mesh, said mesh having a plurality of openings, the plastic layers being fused together through said openings to encapsulate the mesh, one of said plastic layers also including a metal foil fused to the other side.
2. The sheet of claim 1 wherein the mesh is a metal wire support mesh.
3. The sheet of claim 2 wherein the mesh is of rectangular form.
4. The sheet of claim 2 wherein the mesh is of diamond form.
5. The sheet of claim 1 wherein said plastic material is polyethylene.
6. The sheet of claim 1 wherein said metal foil is aluminum foil.
7. The sheet of claim 1 including metal foil on the outside of each layer of plastic material.

* * * * *